United States Patent
Wu et al.

(10) Patent No.: US 10,880,122 B2
(45) Date of Patent: Dec. 29, 2020

(54) FORWARDING PACKET

(71) Applicant: NEW H3C TECHNOLOGIES CO., LTD., Zhejiang (CN)

(72) Inventors: Wen Wu, Beijing (CN); Liang Wang, Beijing (CN); Yuelei Chao, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 0 days.

(21) Appl. No.: 16/462,402

(22) PCT Filed: Nov. 17, 2017

(86) PCT No.: PCT/CN2017/111667
§ 371 (c)(1),
(2) Date: May 20, 2019

(87) PCT Pub. No.: WO2018/090980
PCT Pub. Date: May 24, 2018

(65) Prior Publication Data
US 2019/0305987 A1    Oct. 3, 2019

(30) Foreign Application Priority Data
Nov. 18, 2016    (CN) .......................... 2016 1 1034213

(51) Int. Cl.
*H04L 12/46* (2006.01)
*H04L 12/861* (2013.01)

(52) U.S. Cl.
CPC .......... *H04L 12/4633* (2013.01); *H04L 12/46* (2013.01); *H04L 49/9057* (2013.01)

(58) Field of Classification Search
None
See application file for complete search history.

(56) References Cited

U.S. PATENT DOCUMENTS 7,801,021 B1 * 9/2010 Triantafillis ........ H04L 12/4633
370/216
2008/0298304 A1 * 12/2008 Yagyu ..................... H04L 45/26
370/328
(Continued)

FOREIGN PATENT DOCUMENTS

CN    101695053 A    4/2010
CN    102739521 A    10/2012
(Continued)

OTHER PUBLICATIONS

European Patent Office, Extended European Search Report Issued in Application No. 17871799.7, dated Jul. 10, 2019, Germany, 7 pages.
(Continued)

*Primary Examiner* — Eunsook Choi
(74) *Attorney, Agent, or Firm* — Hauptman Ham, LLP (57) ABSTRACT

A method of forwarding a packet and a network device are provided. According to an example of the method, when serving as a previous-hop device of a destination device of a first tunnel, the network device receives a first notification message from the destination device of the first tunnel, where information relating the first tunnel is carried in the first notification message. The network device configures a forwarding entry, where a match domain of the forwarding entry includes the information relating the first tunnel. After an encapsulated data packet is received, and if the encapsulated data packet matches the forwarding entry, the network device decapsulates the encapsulated data packet and then forwards the decapsulated data packet to the destination device of the first tunnel.

12 Claims, 4 Drawing Sheets

(56) References Cited

U.S. PATENT DOCUMENTS

| | | | |
|---|---|---|---|
| 2011/0110269 A1* | 5/2011 | Maenpaa | H04L 67/1048 370/254 |
| 2012/0099602 A1 | 4/2012 | Nagapudi et al. | |
| 2012/0284416 A1* | 11/2012 | Li | H04L 29/06183 709/228 |
| 2013/0136128 A1 | 5/2013 | Robinson et al. | |
| 2013/0318219 A1* | 11/2013 | Kancherla | H04L 41/0806 709/222 |
| 2014/0050223 A1 | 2/2014 | Foo et al. | |
| 2014/0146817 A1 | 5/2014 | Zhang | |
| 2014/0198794 A1* | 7/2014 | Mehta | H04L 45/04 370/392 |
| 2015/0138948 A1* | 5/2015 | Cai | H04L 41/0654 370/221 |
| 2015/0156035 A1 | 6/2015 | Foo et al. | |
| 2015/0229724 A1* | 8/2015 | Ray | H04L 45/026 370/352 |
| 2015/0296548 A1* | 10/2015 | Roeland | H04W 36/0022 370/329 |
| 2017/0104671 A1 | 4/2017 | Zhang et al. | |

FOREIGN PATENT DOCUMENTS

| | | |
|---|---|---|
| CN | 104509033 | 4/2015 |
| CN | 104521195 A | 4/2015 |
| CN | 105337881 A | 2/2016 |
| EP | 2940952 A1 | 11/2015 |
| EP | 3026856 A1 | 6/2016 |
| JP | 2005012290 | 1/2005 |
| JP | 2014523214 | 9/2014 |

OTHER PUBLICATIONS

ISA State Intellectual Property Office of the People's Republic of China, Written Opinion of the International Searching Authority Issued in Application No. PCT/CN2017/111667, dated Jan. 26, 2018, WIPO, 3 pages.

ISA State Intellectual Property Office of the People's Republic of China, International Search Report Issued in Application No. PCT/CN2017/111667, dated Jan. 26, 2018, WIPO, 4 pages.

State Intellectual Property Office of the People's Republic of China, Office Action and Search Report Issued in Application No. 201611034213.1, dated Nov. 5, 2019, 9 pages,(Submitted with Machine Translation).

Sha Yi et al., "Routing Protocol Based on Dynamic Exponential Smoothing Prediction in Ad Hoc Network", Journal of Chinese Computer Systems, vol. 33, No. 3. 2012, 4 pages.

European Patent Office, Office Action Issued in Application No. 17871799.7, dated Jul. 3, 2020, Germany, 5 pages.

Japanese Patent Office, Office Action Issued in Application No. 2019-526218, dated Aug. 25, 2020, 6 pages. (Submitted with Machine Translation).

* cited by examiner

| Layer-2 header | Outer layer IP header | Outer layer GRE header | Inner layer IP header | Inner layer GRE header |

FORWARDING PACKET

CROSS REFERENCE TO RELATED APPLICATION

The present application is a National Phase of International Application Number PCT/CN2017/111667, filed Nov. 17, 2017, and claims priority to Chinese Patent Application No. 201611034213.1 entitled "METHOD AND DEVICE FOR FORWARDING PACKET" filed on Nov. 18, 2016, the entire content of which is incorporated herein by reference.

BACKGROUND

A Generic Routing Encapsulation (GRE) protocol serves to encapsulate data packets of a certain protocol (such as Internet Protocol (IP), Multiprotocol Label Switching (MPLS), Ethernet and the like) so that the encapsulated data packets can be transmitted via another network layer protocol. A path used for transmitting encapsulated data packets in a network is referred to as a GRE tunnel. The GRE tunnel is a virtual point-to-point connection, and devices at two ends of the tunnel may perform GRE encapsulation and decapsulation on the data packets, respectively.

DETAILED DESCRIPTION OF THE EMBODIMENTS

Example embodiments will be described in detail herein with the examples thereof expressed in the drawings. When the following descriptions involve the drawings, like numerals in different drawings represent like or similar elements unless stated otherwise. The implementations described in the following example embodiments do not represent all implementations consistent with the present disclosure. On the contrary, they are examples of an apparatus and a method consistent with some aspects of the present disclosure described in detail in the appended claims.

The terminology used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated recited items.

It should be appreciated that although different information may be described using the terms such as first, second, third, etc. in the present disclosure, the information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

A process of GRE encapsulation is to be described as below. A raw packet may include a layer-2 header of 14 bytes, an original IP header of 20 bytes, and a payload of 30 bytes. In the GRE encapsulation process, a GRE header of 4 bytes and a new IP header of 20 bytes may be added to the raw packet. Thus, the length of the GRE-encapsulated packet is increased by 24 bytes compared to that of the raw packet. As a result, the data traffic of each link over a GRE tunnel is increased and more link bandwidth is occupied.

A method of forwarding a packet and a network device to which the method is applied are provided according to the following examples of the present disclosure. The method in an example of the present disclosure may be executed by a network device such as a router. For convenience of description, the network device which executes the method according to the example of the present disclosure is hereinafter referred to as a first device.

Figure 1:
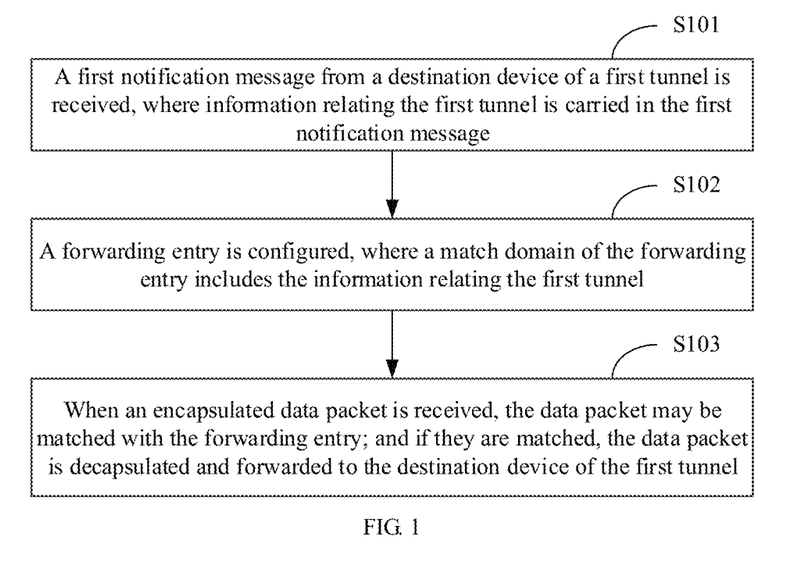
FIG. 1 illustrates a flow diagram of a method of forwarding a packet according to an example of the present disclosure.

As shown in FIG. 1, a method of forwarding a packet executed by the first device may include the following blocks.

At block S101, the first device may receive a first notification message from a destination device of a first tunnel, where information relating the first tunnel is carried in the first notification message, and the first device serves as a previous-hop device of the destination device of the first tunnel.

The information relating the first tunnel may include: an IP address of a source device of the first tunnel, an IP address of a destination device of the first tunnel, and an Identifier (ID) of a protocol to which the first tunnel conforms.

The first tunnel may be a GRE tunnel, a Point-to-Point Protocol over Ethernet (PPPoE) tunnel, a Layer-2 Tunneling Protocol (L2TP) or the like, which is not limited in the example of the present disclosure.

At block S102, the first device may configure a forwarding entry, where a match domain of the forwarding entry includes the information relating the first tunnel.

The first device may configure the above forwarding entry on a software plane or a hardware plane, and also configure the match domain of the forwarding entry on the software plane and an action domain of the forwarding entry on the hardware plane, or configure the match domain on the hardware plane and the action domain on the software plane, which is not limited in the example of the present disclosure.

In an example, the first device may configure a forwarding entry as shown in table 1 after obtaining the information relating the first tunnel from the first notification message:

TABLE 1

| Match | Actions |
| --- | --- |
| Source IP address: an IP address of the source device of the first tunnel<br>Destination IP address: an IP address of the destination device of the first tunnel<br>Protocol ID: an ID of the protocol to which the first tunnel conforms | Decapsulating a packet and then forwarding it to the destination device of the first tunnel |

At block S103, when receiving an encapsulated data packet, the first device may match the data packet with the forwarding entry as shown in table 1, and if they are matched, the first device may decapsulate the data packet to obtain a decapsulated data packet and then forward the decapsulated data packet to the destination device of the first tunnel.

In block S103, when receiving the encapsulated data packet, the first device may match the data packet with the match domain of the forwarding entry located on the software plane or the hardware plane, and if they are matched, the first device may decapsulate the data packet to obtain a raw data packet and forward the raw data packet to the destination device of the first tunnel based on the action domain of the forwarding entry.

In the method of the above example, the destination device of a tunnel may transmit a notification message to a previous-hop device of the destination device, where the information relating the tunnel is carried in the notification message. After receiving the notification message, the previous-hop device may configure a forwarding entry in which the match domain includes the information relating the tunnel. Subsequently, when receiving an encapsulated data packet, the previous-hop device may decapsulate the encapsulated data packet, and if the encapsulated data packet matches the forwarding entry, then the previous-hop device may forward the decapsulated data packet to the destination device of the tunnel. Thus, the previous-hop device of the destination device of the tunnel may decapsulate the data packet to obtain a raw data packet in advance and forward the raw data packet to the destination device. In this way, on one hand, the decapsulation processing pressure of the destination device can be relieved, and when a plurality of tunnels are established between the source device and the destination device, the packet decapsulation processing work for a part of the tunnels can be shifted to the previous-hop device. On the other hand, since only the raw data packet rather than the encapsulated data packet is transmitted over the link between the previous-hop device and the destination device, the data traffic of the link can be reduced and the bandwidth of the link can be saved.

In addition, an aging mechanism may be provided for a forwarding entry. For example, if the first notification message from the destination device of the first tunnel is not received within a predetermined time, the first device may delete the forwarding entry as shown in table 1. Therefore, when an encapsulated data packet is received from the source device of the first tunnel, the first device may directly forward the data packet to the destination device of the first tunnel instead of decapsulating the data packet. Subsequently, when receiving the first notification message from the destination device again, the first device may execute the method as shown in FIG. 1 to reconfigure the forwarding entry and perform the operation of decapsulating a packet and forwarding it to the destination device of the first tunnel according to the forwarding entry.

To enable a destination device of a tunnel to transmit a notification message to a previous-hop device of the destination device, a tunnel keepalive mechanism may be employed in an example of the present disclosure. For example, based on the keepalive mechanism of a GRE tunnel, when the GRE keepalive function is enabled, a source device may periodically transmit a keepalive request packet to a destination device over the GRE tunnel. If the source device has not received a keepalive response packet returned by the destination device after continuously transmitting a predetermined number of keepalive request packets, the source device may set the GRE tunnel in a down status. In case that the GRE tunnel is in a down status, the source device may switch the status of the GRE tunnel into an up status if a keepalive response packet returned by the destination device is received, or otherwise maintain the GRE tunnel in the down status. Likewise, such tunnels as a PPPoE tunnel and an L2TP tunnel are adapted to similar keepalive mechanisms.

By using the above-described tunnel keepalive mechanism, after receiving a keepalive request packet from the source device over the first tunnel, the destination device of the first tunnel may transmit the first notification message carrying the information relating the first tunnel to the previous-hop device (i.e., the first device) transmitting the keepalive request packet. Thus the first device is allowed to perform the operation blocks as shown in FIG. 1. In the actual implementation process, commands may be configured, and according to the commands, the first device may configure a forwarding entry on the first device after receiving the first notification message from the destination device of the first tunnel. Alternatively, corresponding provisions may be set based on a protocol standard, which is not limited in the example of the present disclosure.

In an example, the first device may also serve as a destination device of a particular tunnel. Thus, when serving as, for example, a destination device of a second tunnel, the first device may receive a keepalive request packet from a source device over the second tunnel, and then transmit a second notification message to a previous-hop device transmitting the keepalive request packet. Information relating the second tunnel is carried in the second notification message. The information relating the second tunnel may include an IP address of the first device, an IP address of the source device, and an ID of a protocol to which the second tunnel conforms. The second tunnel may be a GRE tunnel, a PPPoE tunnel, an L2TP tunnel or the like, which is not limited in the example of the present disclosure.

In an example of the present disclosure, the protocols and packet formats of the above-mentioned notification messages (including the first notification message and the second notification message) are not limited as long as they can carry the information relating a tunnel and can serve as a notification. The notification message may be a keepalive response packet with Time To Live (TTL) being 1. The TTL indicates the maximum hops by which a data packet can be forwarded in a network. For example, when serving as the destination device of the second tunnel, the first device may receive a keepalive request packet from the source device, and then return a keepalive response packet to the source device according to the tunnel keepalive mechanism. In addition, the first device may transmit a keepalive response packet with TTL=1 as a notification message to the previous-hop device transmitting the keepalive request packet.

Thus, the previous-hop device may perform the operation blocks as shown in FIG. 1. The TTL is set to 1, which may achieve two effects: one is to enable the keepalive response packet to terminate at the previous-hop device without being continuously forwarded, and the other one is to serve as an identifier of the notification message. That is, TTL=1 is used to identify the keepalive response packet as a notification message.

In an example of the present disclosure, the tunnel keepalive mechanism may be employed. After receiving a keepalive request packet, the destination device of the tunnel may additionally transmit a keepalive response packet with TTL=1 to a previous-hop device transmitting the keepalive request packet, so as to notify the previous-hop device to configure a forwarding entry so that a subsequent encapsulated data packet may be decapsulated on the previous-hop device in advance. Moreover, when using the keepalive response packet with TTL=1 as a notification message, there may be no need to define a new message type or modify the format of the keepalive response packet, which brings out a wide application range.

Figure 2:
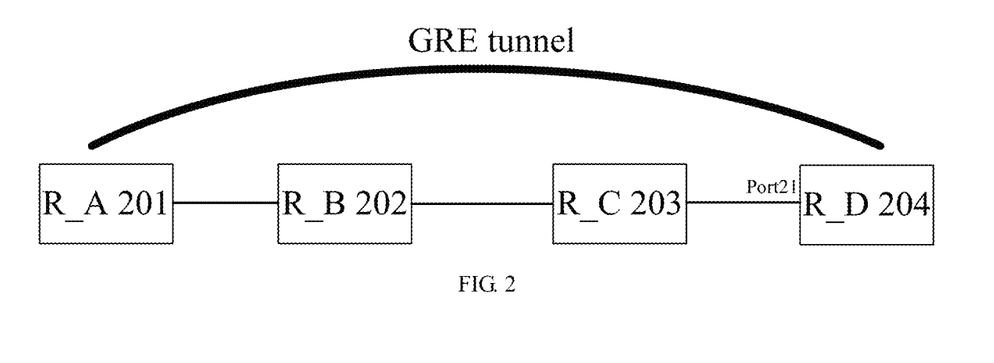
FIG. 2 illustrates a schematic diagram of a network structure according to an example of the present disclosure.

The method of the above example is to be described in detail by taking an actual network shown in FIG. 2 for example. As shown in FIG. 2, a GRE tunnel may be established between a device R_A 201 and a device R_D 204, where the device R_A 201 is a source device of the GRE tunnel, and the device R_D 204 is a destination device of the GRE tunnel, and a device R_C 203 is a previous-hop device of the destination device. The device R_A 201 has an IP address as IP-A and an MAC address as MAC-A; the IP address of the device R_C 203 is IP-C and its MAC address is MAC-C; and the IP address of the device R_D 204 is IP-D and its MAC address is MAC-D.

Figure 3:
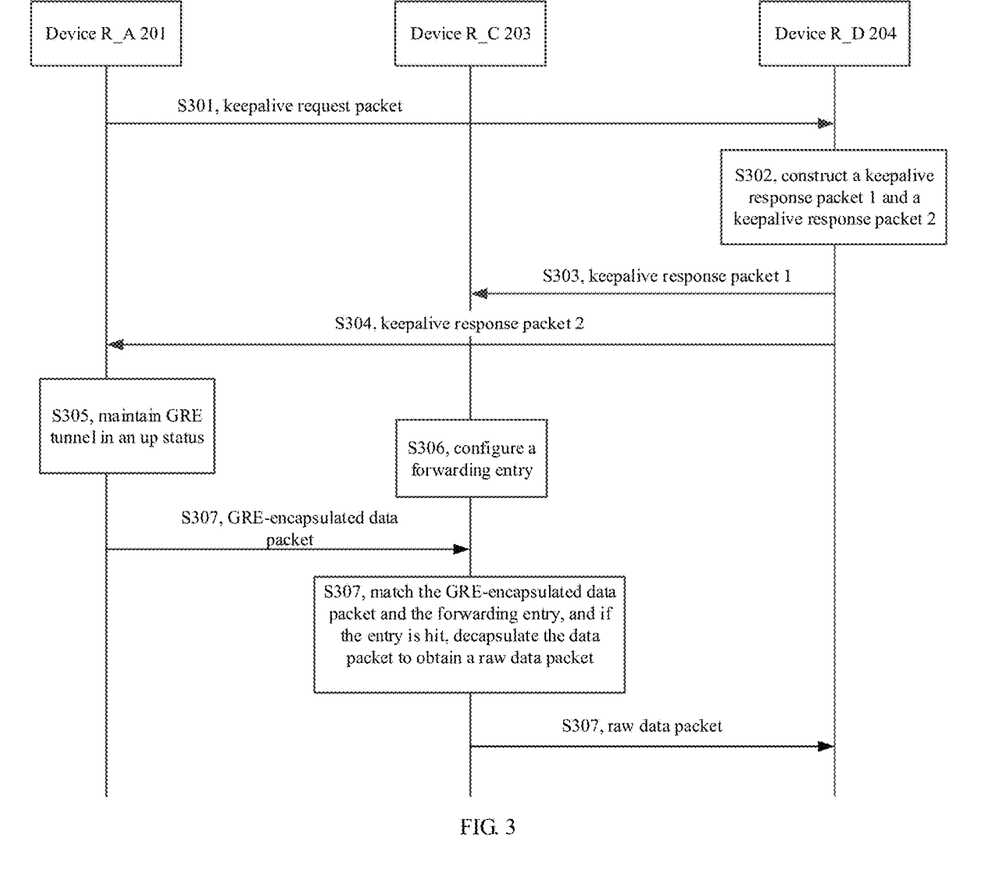
FIG. 3 illustrates a flow diagram of interaction of different devices shown in FIG. 2.

The method of forwarding a packet in this case is as shown in FIG. 3, which specifically includes the following blocks.

At block S301, the device R_A 201 may transmit a keepalive request packet to the device R_D 204 over a GRE tunnel.

Figure 4:
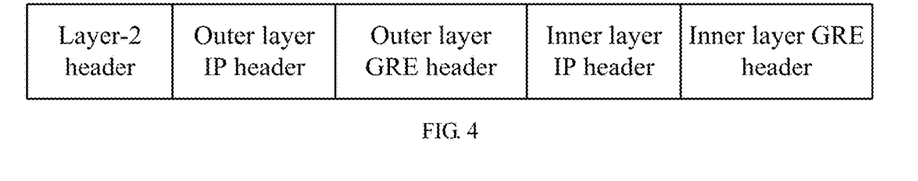
FIG. 4 illustrates a schematic diagram of a format of a keepalive request packet according to an example of the present disclosure.

The format of the keepalive request packet is as shown in FIG. 4, including: a layer-2 header, an outer layer IP header, an outer layer GRE header, an inner layer IP header, and an inner layer GRE header. In the block S301, the source IP address of the outer layer IP header of the keepalive request packet is IP-A and its destination IP address is IP-D, and the source IP address of the inner layer IP header is IP-D and its destination IP address is IP-A.

At block S302, after receiving the keepalive request packet, the device R_D 204 may decapsulate the keepalive request packet and then construct two keepalive response packets: a keepalive response packet 1 and a keepalive response packet 2.

For example, after receiving the keepalive request packet, the device R_D 204 may record an ingress port of the keepalive request packet as Port21 and parse the keepalive request packet to determine a source MAC address in the layer-2 header as MAC-C and a destination MAC address as MAC-D. Then, the device R_D 204 may pop out the outer layer IP header and the outer layer GRE header of the keepalive request packet to obtain the remaining layer-2 header, inner layer IP header and inner layer GRE header, and construct the keepalive response packet 1 and the keepalive response packet 2 with these obtained headers.

The process of constructing the keepalive response packet 1 is as follows: setting the TTL in the IP header to 1, and interchanging the source MAC address MAC-C and the destination MAC address MAC-D in the layer-2 header, i.e., taking MAC-D as the source MAC address and MAC-C as the destination MAC address. Thus, the source MAC address of the layer-2 header of the constructed keepalive response packet 1 is MAC-D and its destination MAC address is MAC-C and the TTL in the IP header is 1. The keepalive response packet 1 is a notification message.

The keepalive response packet 2 is a keepalive response packet with the TTL not being 1, and the source MAC address in the layer-2 header of the packet is MAC-D and the destination MAC address is the MAC address of a next-hop device to which the keepalive response packet 2 is forwarded and the TTL in the IP header is 254. Such information as an egress port of the keepalive response packet 2 and an MAC address of a next-hop device may be obtained by searching an IP route table for corresponding next-hop information based on the IP address IP-A of the device R_A 201.

At block S303, the device R_D 204 may transmit the keepalive response packet 1 to the device R_C 203 through a Port21.

Since the next-hop device obtained according to the IP-A is possibly not the device R_C 203, in block 303, the keepalive response packet 1 may be transmitted through the ingress port Port21 of the keepalive request packet rather than an egress port obtained by searching in the IP route table. Thus, it can be ensured that the keepalive response packet 1 may be transmitted to the device R_C 203.

At block S304, the device R_D 204 may transmit the keepalive response packet 2 to the device R_A 201 through the egress port obtained by searching in the IP route table.

As can be seen from block S302 to block S304, the TTL values in the IP headers of the keepalive response packet 1 and the keepalive response packet 2 are different, and the manners of determining the egress ports are different. The TTL of the keepalive response packet 1 is set to 1 rather than 254, which is intended to, on one hand, allow the keepalive response packet 1 to be forwarded just by one hop and thus to be terminated on the device R_C 203 without being continuously forwarded, and on the other hand, use TTL=1 to identify the keepalive response packet 1 as a notification message. In addition, the egress port of the keepalive response packet 1, rather than the egress port obtained according to the IP-A, may be determined as the ingress port Port21 of the keepalive request packet. The reason is that: the keepalive response packet 1 is to be transmitted back to the second-to-last-hop device, i.e., the device R_C 203, in a forwarding path (i.e., device R_A 201→device R_B 202→device R_C 203 device R_D 204) of the keepalive request packet, therefore, the keepalive response packet 1 must be transmitted from the ingress port of the keepalive request packet. The keepalive response packet 2 is to be transmitted to the device R_A 201; therefore, according to the GRE tunnel keepalive mechanism, a corresponding egress port may be obtained by searching the IP route table based on the IP address IP-A of the device R_A 201, and the keepalive response packet 2 may be forwarded to the device R_A 201 through the obtained egress port.

In an actual implementation process, the order of transmitting the keepalive response packet 1 and the keepalive response packet 2 may not be specified. The keepalive response packet 1 is a functional notification message for notifying the device R_C 203 of configuring a forwarding entry so as to decapsulate a packet in advance, and the keepalive response packet 2 is a keepalive maintenance message. In one implementation, it may be such an order in which block S303 is performed first and block S304 is then performed. In another implementation, it may also be such an order in which block S304 is performed first and block S303 is then performed.

At block S305, the device R_A 201 may maintain the GRE tunnel in an up status after receiving the keepalive response packet 2.

Subsequently, the device R_A 201 may perform block S301 again when a predetermined transmitting time interval expires.

At block S306, after receiving the keepalive response packet 1, the device R_C 203 may parse the packet to determine TTL in the IP header being 1, and directly transmit the packet to a CPU for process. The CPU may obtain the source IP address IP-D, the destination IP address IP-A and the protocol ID from the IP header of the keepalive response packet 1 and then configure a forwarding entry as shown in table 2 at the hardware plane:

TABLE 2

| Match | Actions |
| --- | --- |
| Source IP address: IP-A<br>Destination IP address: IP-D<br>Protocol ID: ID of the GRE protocol | Decapsulating a packet and<br>then forwarding it to the<br>device R_D 204 |

In addition, when receiving the above keepalive response packet 1, the device R_C 203 may start a timer to start timing from 0. Subsequently, the timer may be restarted every time the above keepalive response packet 1 is received, such that the timer restarts timing from 0. If the time of the timer reaches predetermined time T and the device R_C 203 does not receive a new keepalive response packet 1, the forwarding entry may be deleted.

At block S307, after receiving a GRE-encapsulated data packet from the device R_A 201, the device R_C 203 may match the GRE-encapsulated data packet with the forwarding entry as shown in table 2, and when the forwarding entry is hit, the device R_C 203 may decapsulate the GRE-encapsulated data packet according to the action domain of the forwarding entry and then forward it to the device R_D 204.

As can be seen from the method as shown in FIG. 3, in the method of an example of the present disclosure, the keepalive mechanism of the GRE tunnel is employed. After receiving a keepalive request packet from the source device R_A 201, the destination device R_D 204 of the GRE tunnel may additionally transmit a keepalive response packet with TTL=1 to the previous-hop device R_C 203 transmitting the keepalive request packet when responding to the keepalive request packet. Thus, the previous-hop device R_C 203 may configure a forwarding entry. According to the forwarding entry, an encapsulated data packet from the device R_A 201 may be decapsulated in advance and then forwarded to the device R_D 204. As a result, the decapsulation processing pressure of the destination device R_D 204 of the tunnel is reduced and the link overhead of the GRE tunnel is reduced.

Further, the device R_C 203 may also support security authentication processing of the tunnel when decapsulating the encapsulated data packet according to the forwarding entry as shown in table 2. For example, the GRE tunnel may support two security authentication mechanisms:

verification by key identification and end-to-end check.

(1) Key Verification

In block S306, after receiving the keepalive response packet 1 from the device R_D 204, the device R_C 203 may obtain and store a Key of the GRE tunnel from the device R_D 204. Alternatively, when a Key is carried in the keepalive response packet 1, the device R_C 203 may directly obtain the key from the keepalive response packet 1 and store it.

After obtaining the Key, the device R_C 203 may configure the forwarding entry. The action domain of the forwarding entry may be: decapsulating the encapsulated data packet and then forwarding it to the device R_D 204 when determining that the Key carried in the encapsulated data packet is consistent with the locally stored Key.

Thus, in block S307, after receiving the GRE-encapsulated data packet from the device R_A 201, the device R_C 203 may match the GRE-encapsulated data packet with the forwarding entry, and when the forwarding entry is hit, the device R_C 203 may determine whether the Key carried in the GRE-encapsulated data packet is consistent with the locally stored Key according to the action domain of the forwarding entry. If the two keys are consistent, the device R_C 203 may decapsulate the GRE-encapsulated data packet and forwards the data packet to the device R_D 204.

(2) End-to-End Check

A check indication mark such as a checksum may be carried in the keepalive response packet 1. In block S306, after receiving the keepalive response packet 1, the device R_C 203 may configure the forwarding entry according to the check indication mark. The action domain of the forwarding entry may be: calculating the checksum of an encapsulated data packet, and decapsulating the encapsulated data packet and then forwarding it to the device R_D 204 when determining that the calculated checksum is consistent with the checksum carried in the encapsulated data packet.

Thus, in block S307, after receiving the GRE-encapsulated data packet from the device R_A 201, the device R_C 203 may match the GRE-encapsulated data packet with the forwarding entry. When the forwarding entry is hit, the device R_C 203 may calculate the checksum of the GRE-encapsulated data packet and determine whether the calculated checksum is consistent with the checksum carried in the GRE-encapsulated data packet according to the action domain of the forwarding entry. If the two checksums are consistent, the device R_C 203 may decapsulate the GRE-encapsulated data packet and then forwards it to the device R_D 204.

Apparently, the method as shown in FIG. 3 is also applicable to other tunnels supporting the keepalive mechanism, such as a PPPoE tunnel and an L2TP tunnel, which is not limited in the example of the present disclosure.

Corresponding to an example of the above method of forwarding a packet, the present disclosure also provides an example of a network device.

Figure 5:
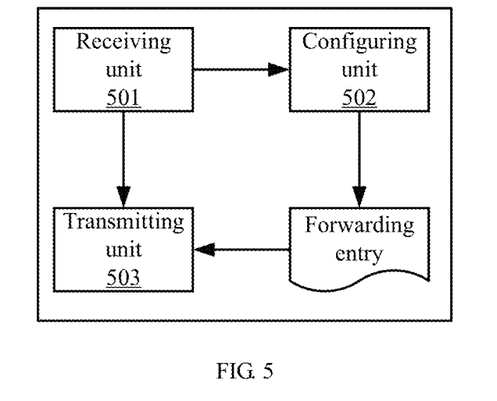
FIG. 5 illustrates a schematic structure diagram of a network device according to an example of the present disclosure.

Referring to FIG. 5, the network device according to an example of the present disclosure includes the following modules: a receiving unit 501, a configuring unit 502 and a transmitting unit 503, where:

the receiving unit 501 is configured to receive a first notification message from a destination device of a first tunnel, where the network device serves as a previous-hop device of the destination device of the first tunnel, and information relating the first tunnel is carried in the first notification message;

the configuring unit 502 is configured to configure a forwarding entry after the receiving unit 501 receives the first notification message, where a match domain of the forwarding entry includes the information relating the first tunnel; and the transmitting unit 503 is configured to decapsulate an encapsulated data packet to obtain a decapsulated data packet when the encapsulated data packet matches the forwarding entry after the receiving unit 501 receives the encapsulated data packet over the first tunnel, and forward the decapsulated data packet to the destination device of the first tunnel.

The receiving unit 501 is further configured to receive a keepalive request packet transmitted from a source device of a second tunnel over the second tunnel when the network device serves as a destination device of the second tunnel.

The transmitting unit 503 is further configured to transmit a second notification message to the previous-hop device transmitting the keepalive request packet after the receiving unit 501 receives the keepalive request packet, where information relating the second tunnel is carried in the second notification message.

Figure 6:
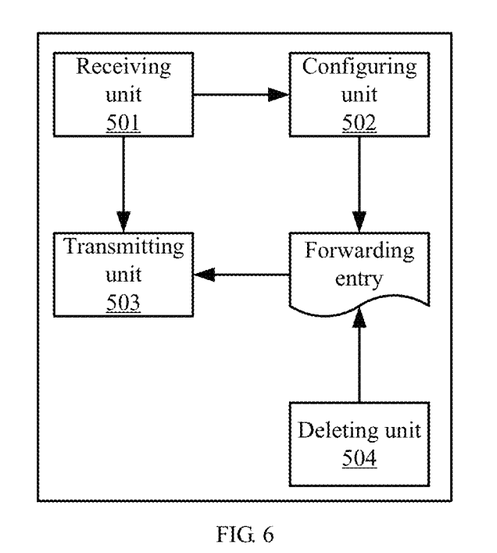
FIG. 6 illustrates another schematic structure diagram of a network device according to an example of the present disclosure.

Additionally, as shown in FIG. 6, the above-mentioned network device also includes: a deleting unit 504. The receiving unit 501 determines whether a third notification message from the destination device of the first tunnel is received within a predetermined time after receiving the first notification message, where the third notification message carries information relating the first tunnel. If the receiving unit 501 does not receive the third notification message within the predetermined time, the deleting unit 504 deletes the forwarding entry from the network device.

The receiving unit 501 starts a timer to start timing when receiving the first notification message from the destination device of the first tunnel; and the receiving unit 501 may determine that the third notification message from the destination device of the first tunnel is not received within the predetermined time if the third notification message is still not received when the time of the timer reaches the predetermined time.

The first notification message received by the receiving unit 501 and the second notification message transmitted by the transmitting unit 503 are keepalive response packets with Time to Live (TTL) being 1.

The information relating the first tunnel includes: IP addresses of devices at two ends of the first tunnel and an Identifier (ID) of a protocol to which the first tunnel conforms. The information relating the second tunnel includes: IP addresses of devices at two ends of the second tunnel and an Identifier (ID) of a protocol to which the second tunnel conforms. Specifically, the devices at the two ends of the first tunnel are the source device and the destination device of the first tunnel, and the devices at the two ends of the second tunnel are the network device and the source device of the second tunnel.

The above-mentioned first tunnel or second tunnel is one of a GRE tunnel, a PPPoE tunnel and an L2TP tunnel.

Details of the implementation process of the functions and effects of different units in the above-described device may be seen from the implementation process of corresponding blocks in the above-described method, which will not be redundantly described herein.

Figure 7:
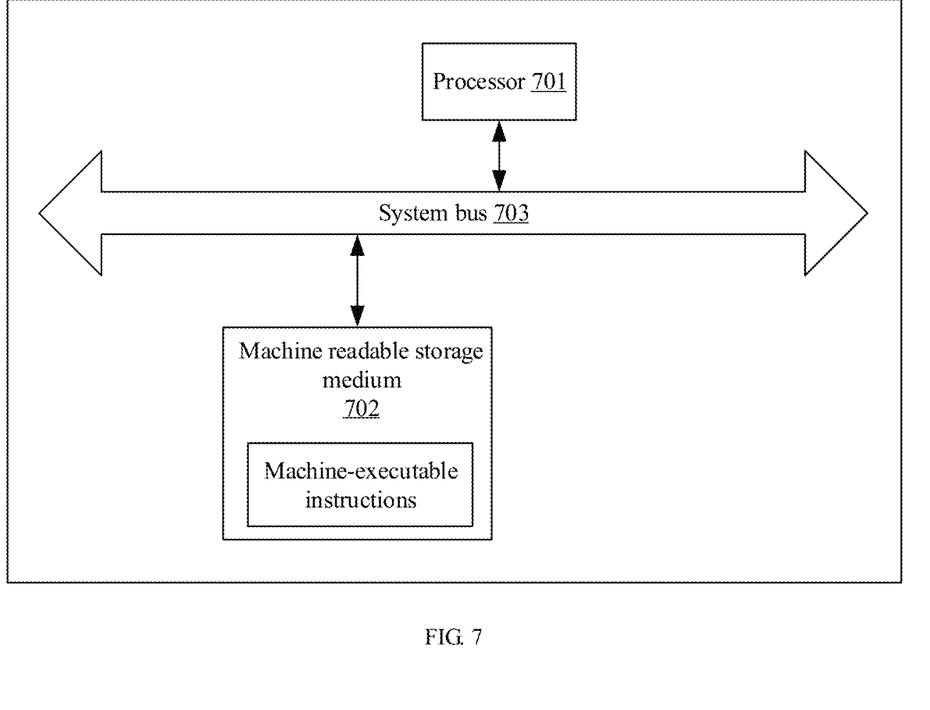
FIG. 7 illustrates yet another schematic structure diagram of a network device according to an example of the present disclosure.

FIG. 7 illustrates a schematic diagram of a hardware structure of a network device according to an example of the present disclosure. The network device includes a processor 701 and a machine-readable storage medium 702 that stores machine-executable instructions. The processor 701 may communicate with the machine readable storage medium 702 via a system bus 703. Moreover, by reading and executing the machine-executable instructions on the machine-readable storage medium 702, the processor 701 may execute the method of forwarding a packet as described above. Typically, the network device may also include other hardware according to the actual functions of the network device, which will not be redundantly described herein.

The machine readable storage medium 702 mentioned herein may be: any electronic, magnetic, optical or other physical storage device and may contain or store information such as executable instructions, data and so on. For example, the machine-readable storage medium may be a Read-Only Memory (ROM), a volatile memory, a nonvolatile memory, a flash memory, a storage drive (e.g. hard disk drive), a solid state harddisk, or any type of storage disk.

For example, when reading and executing the machine-executable instructions on the machine-readable storage medium 702, the processor 701 is caused to perform the following operations:

receiving a first notification message from a destination device of a first tunnel, where the network device is a previous-hop device of the destination device of the first tunnel, and information relating the first tunnel is carried in the first notification message;

configuring a forwarding entry, where a match domain of the forwarding entry includes the information relating the first tunnel;

decapsulating a received encapsulated data packet to obtain a decapsulated data packet when the encapsulated data packet matches the forwarding entry; and forwarding the decapsulated data packet to the destination device of the first tunnel.

In an example, the processor 701 is also caused by the machine-executable instructions to:

receive a keepalive request packet transmitted from a source device of a second tunnel over the second tunnel, where the network device is a destination device of the second tunnel; and transmit a second notification message to a previous-hop device transmitting the keepalive request packet, where information relating the second tunnel is carried in the second notification message.

In an example, the processor 701 is also caused by the machine-executable instructions to:

determine whether a third notification message from the destination device of the first tunnel is received within a predetermined time after receiving the first notification message, where the third notification message carries the information relating the first tunnel; and delete the forwarding entry when the third notification message is not received within the predetermined time.

In an example, the processor 701 is also caused by the machine-executable instructions to:

start a timer to start timing when the first notification message from the destination device of the first tunnel is received; and determine that the third notification message from the destination device of the first tunnel is not received within the predetermined time if the third notification message is still not received when the time of the timer reaches the predetermined time.

In an example, the first notification message and the second notification message are keepalive response packets with Time to Live (TTL) being 1.

In an example, the information relating the first tunnel includes: Internet Protocol (IP) addresses of devices at two ends of the first tunnel and an Identifier (ID) of a protocol to which the first tunnel conforms; and the information relating the second tunnel includes: Internet Protocol (IP) addresses of devices at two ends of the second tunnel and an Identifier (ID) of a protocol to which the second tunnel conforms.

Since the device examples substantially correspond to the method examples, a reference may be made to part of the descriptions of the method examples for the related part. The device examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

It needs to be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not recited explicitly or those elements inherent to such a process, method, article or device. Without more limitations, an element defined by the statement "including a . . . " shall not be precluded to include additional same elements present in a process, method, article or device including the elements.

The above are detailed descriptions of a method and a device provided according to the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting to the present disclosure.

The invention claimed is:

1. A method of forwarding a packet, comprising:
    receiving, by a network device, a first notification message from a destination device of a first tunnel, wherein the network device is a previous-hop device of the destination device of the first tunnel, and information relating the first tunnel is carried in the first notification message;
    configuring, by the network device, a forwarding entry, wherein a match domain of the forwarding entry comprises the information relating the first tunnel;
    decapsulating, by the network device, an encapsulated data packet to obtain a decapsulated data packet when the encapsulated data packet received by the network device matches the forwarding entry; and
    forwarding, by the network device, the decapsulated data packet to the destination device of the first tunnel.

2. The method according to claim 1, further comprising:
    receiving, by the network device, a keepalive request packet transmitted from a source device of a second tunnel over the second tunnel, wherein the network device is a destination device of the second tunnel; and
    transmitting, by the network device, a second notification message to a previous-hop device transmitting the keepalive request packet, wherein information relating the second tunnel is carried in the second notification message.

3. The method according to claim 1, further comprising:
    determining, by the network device, whether a third notification message from the destination device of the first tunnel is received within a predetermined time after receiving the first notification message, wherein the third notification message carries the information relating the first tunnel; and
    deleting, by the network device, the forwarding entry when the third notification message is not received within the predetermined time.

4. The method according to claim 3, wherein determining whether the third notification message from the destination device of the first tunnel is received within the predetermined time comprises:
    starting, by the network device, a timer to start timing when the first notification message from the destination device of the first tunnel is received; and
    determining, by the network device, that the third notification message from the destination device of the first tunnel is not received within the predetermined time in the event that the third notification message is still not received when the timer reaches the predetermined time.

5. The method according to claim 2, wherein the first notification message and the second notification message are a keepalive response packet with Time to Live (TTL) being 1.

6. The method according to claim 2, wherein
    the information relating the first tunnel comprises: Internet Protocol (IP) addresses of devices at two ends of the first tunnel and an Identifier (ID) of a protocol to which the first tunnel conforms; and
    the information relating the second tunnel comprises: IP addresses of devices at two ends of the second tunnel and an ID of a protocol to which the second tunnel conforms.

7. A network device, comprising:
    a processor; and
    a non-transitory machine-readable storage medium that stores machine-executable instructions, wherein by executing the machine-executable instructions, the processor is caused by the machine-executable instructions to:
    receive a first notification message from a destination device of a first tunnel, wherein the network device is a previous-hop device of the destination device of the first tunnel, and information relating the first tunnel is carried in the first notification message;
    configure a forwarding entry, wherein a match domain of the forwarding entry comprises the information relating the first tunnel;
    decapsulate a received encapsulated data packet to obtain a decapsulated data packet when the received encapsulated data packet matches the forwarding entry; and
    forward the decapsulated data packet to the destination device of the first tunnel.

8. The network device according to claim 7, wherein the processor is further caused by the machine-executable instructions to:
    receive a keepalive request packet transmitted from a source device of a second tunnel over the second tunnel, wherein the network device is a destination device of the second tunnel; and transmit a second notification message to a previous-hop device transmitting the keepalive request packet, wherein information relating the second tunnel is carried in the second notification message.

9. The network device according to claim 7, wherein the processor is further caused by the machine-executable instructions to:
determine whether a third notification message from the destination device of the first tunnel is received within a predetermined time after receiving the first notification message, wherein the third notification message carries the information relating the first tunnel; and
delete the forwarding entry when the third notification message is not received within the predetermined time.

10. The network device according to claim 9, wherein when determining whether the third notification message from the destination device of the first tunnel is received within the predetermined time, the processor is further caused by the machine-executable instructions to:
start a timer to start timing when the first notification message from the destination device of the first tunnel is received; and
determine that the third notification message from the destination device of the first tunnel is not received within the predetermined time in the event that the third notification message is still not received when the timer reaches the predetermined time.

11. The network device according to claim 8, wherein the first notification message and the second notification message are a keepalive response packet with Time to Live (TTL) being 1.

12. The network device according to claim 8, wherein
the information relating the first tunnel comprises: Internet Protocol (IP) addresses of devices at two ends of the first tunnel and an Identifier (ID) of a protocol to which the first tunnel conforms; and
the information relating the second tunnel comprises: IP addresses of devices at two ends of the second tunnel and an ID of a protocol to which the second tunnel conforms.

\* \* \* \* \*